Figure 1:
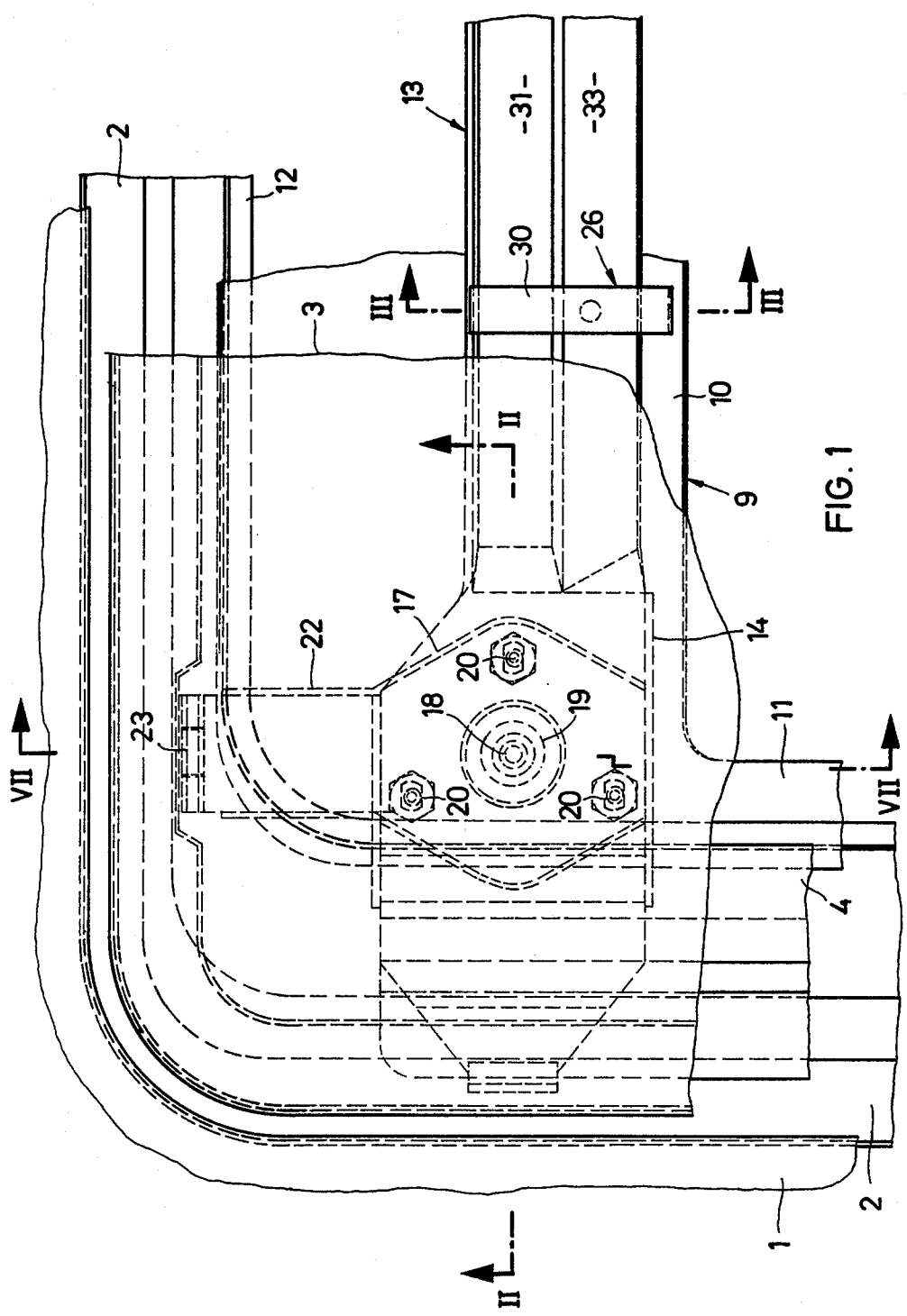

United States Patent [19]

Schlapp

[11] 4,103,962
[45] Aug. 1, 1978

[54] SLIDING ROOF FOR AUTOMOBILES
[75] Inventor: Albert Schlapp, Sprendlingen, Fed. Rep. of Germany
[73] Assignee: Rockwell-Golde G.m.b.H., Frankfurt, Fed. Rep. of Germany
[21] Appl. No.: 740,342
[22] Filed: Nov. 9, 1976
[30] Foreign Application Priority Data
Nov. 15, 1975 [DE] Fed. Rep. of Germany ....... 2551335
[51] Int. Cl. ................................................ B60j 7/10
[52] U.S. Cl. .................................................. 296/137 E
[58] Field of Search ........... 296/137 E, 137 A, 137 B, 296/137 F
[56] References Cited
U.S. PATENT DOCUMENTS
3,863,979  2/1975   Bienert ............................. 296/137 E FOREIGN PATENT DOCUMENTS
1,205,850  11/1965  Fed. Rep. of Germany ....... 296/137 E
1,104,320   2/1968  United Kingdom ................ 296/137 E Primary Examiner—Robert R. Song

[57] ABSTRACT

In sliding roof structure for automobiles including a rigid sliding panel slidably guided in a roof opening on lateral guide rails by means of forward and rear sliding shoes, wherein the panel is connected in a pivotally movable and height-adjustable manner in the vicinity of its forward edge with the forward sliding shoes and the lower face of which is covered with a panel lining secured to a lining frame, the lining frame is attached at the front to a cross-beam which rigidly connects together the forward sliding shoes whereby installation and use of the structure is simplified.

5 Claims, 8 Drawing Figures

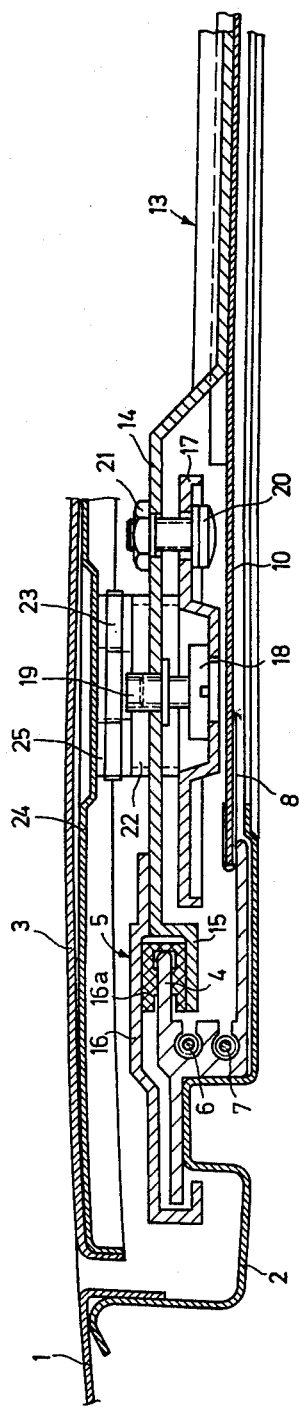
FIG. 2
FIG. 3
FIG. 4

SLIDING ROOF FOR AUTOMOBILES

This invention relates to a sliding roof for automobiles, comprising a rigid sliding panel slidably guided in a roof opening on lateral guide rails by means of front and rear sliding shoes, which panel is connected, in the vicinity of its forward edge, in a pivotally movable and height-adjustable manner with the forward slide shoes and the lower face of which is covered with a panel lining secured to a lining frame.

Sliding roofs of this type with a rigid sliding panel are already known in several forms of construction. The sliding panel is moved either by hand or by an electric motor. With hand operation, the sliding panel is either displaced directly by the actuating force exerted upon a handle or the like mounted on the panel or indirectly, for example by flexible threaded cables guided in a thrust-transmitting manner and acting upon the rear slide shoes in the manner of toothed racks, which are engaged by a toothed pinion driven by a hand crank. The pinion can of course also be driven by an electric motor.

Distinctions are furthermore made among known sliding roofs with a rigid sliding panel, according to the degrees of freedom of movement of the panel. In the conventional sliding roofs, the roof opening can be completely or partially exposed, after lowering the rear edge of the panel, by sliding the panel beneath the rear, fixed roof surface of the vehicle. In a recent sliding roof construction (DT-AS No. 1,605,960), the sliding panel can alternatively also be swung outwards into an oblique position, starting from its closed position, by raising its rear edge above the roof surface in the manner of forwardly hinged ventilating flaps. This enables the sliding roof still to be used for ventilating the vehicle, even at high travelling speeds and/or in bad weather, which with conventional sliding roofs would necessitate a closure of the roof.

In all known sliding roofs, a device is provided on both sides of the sliding panel in the vicinity of its forward edge, for the initially mentioned height adjustment, by means of which device the upper surface of the sliding panel can be adjusted to be flush with the surrounding stationary roof of the vehicle, when the panel is being installed. This adjustability in height, which cannot be dispensed with for compensating manufacturing tolerances, does however lead to the difficulties explained in more detail below in regard to the panel lining which covers the lower face of the sliding panel.

Normally, the lining is fixed directly to the sliding panel, in that the lining frame, consisting of a resilient material of small thickness, for example of spring plate, is secured at the front to a panel stiffener extending transversely to the direction of travel. In some forms of sliding roof construction, the lining frame is guided with clearance at its longitudinal sides in channels which are open towards the roof opening. By the securing of the lining frame to the sliding panel, the lining frame and panel constitute one fixed unit, so that the lining frame and lining must follow the panel when the latter is adjusted in height. With fairly large adjustment movements of the panel, it can therefore occur that the lining frame which slides in the lateral guide channels bears against the upper or lower flange of the channel, which can result in stiffness in operation of the sliding panel, and also can cause damage to the lining.

Even in the more recent form of sliding roof construction already mentioned, in which the panel can be raised outwards by lifting its rear edge above the roof surface, the fixing of the lining frame is usually carried out as above. In this form of construction of a sliding roof, the lining frame cannot however any longer be guided in lateral guide channels, since in its rear region it must follow the outward pivotal movement of the sliding panel. In this case, therefore, the guide rails for the sliding panel are each equipped with a flange extended towards the roof opening, to act as a support for the lining frame. In this sliding roof construction, a pivoting of the sliding panel about its pivot axis mounted near to its forward edge causes a straining of the forward transverse portion of the lining frame about a transverse axis, since the lining frame presses, with its end which projects forward beyond the fixing surface to the forward panel stiffener, upon the forward transverse portion of the sliding roof frame surrounding the roof opening. This straining of the lining frame along its forward edge, that is the elastic deformation of the forward, transverse portion of the lining frame, leads to difficulty in movement when swinging out the sliding roof into its ventilating position.

If, in a sliding roof in which the sliding panel can be raised above the fixed roof surface, the pivoting axis of the panel is now displaced further towards its forward edge, then the forward transverse portion of the lining frame may indeed no longer bear against the associated transverse portion of the sliding roof frame, but during the swinging-out operation the panel lining lifts completely at its forward region away from the associated flange of the transverse portion of the sliding roof frame, resulting in a very annoying gap between the transverse portion of the sliding roof frame and the lining surface when the panel is swung out.

For sliding roofs, wherein the rigid sliding panel can only be lowered below the rear, fixed roof surface and cannot be raised above it, a sliding roof construction is already known (from DT-PS No. 1,283,687), in which the panel lining is adjustable relative to the sliding panel, by the forward transverse portion of the lining frame being secured by clips to threaded sleeves, which in turn are screwed into the forward roof stiffener. Depending upon the screwed-in depth of these sleeves, it is thus possible for the distance between the sliding panel and the panel lining to be adjusted, thus enabling the panel lining to be adjusted in its lateral guide channels, after the panel has itself previously been aligned with the external surface of the roof by means of its special adjustment devices. This known sliding roof construction suffers, however, from the disadvantage that two adjusting operations are now required, in order to install the sliding panel together with its panel lining.

The task underlying the present invention now is to overcome the difficulties stated, and especially to provide an attachment for the panel lining of such a type that an adjustment in height of the panel does not lead to the lining frame bearing or jamming against one of the flanges of a guide channel, without a special adjustment of the panel lining being necessary for this purpose, and with which, in the swinging-out of the sliding panel, neither a straining of the forward lining frame transverse portion takes place, nor does a gap appear between the forward transverse portion of the sliding roof frame and the panel lining. To express it in general terms, the idea of the present invention is to eliminate difficulties and stiffness in operation caused by the panel lining and to avoid additional requirements for adjusting the panel lining.

With the present invention, the above problem is solved, in a sliding roof of the category initially referred to, by the fact that the lining frame is secured at the front to a cross-beam which rigidly connects together the forward slide shoes. By the attachment of the lining frame to a cross-beam connecting the forward slide shoes together, the result is attained that the lining frame is now only indirectly connected to the sliding panel, so that the lining frame and thus, of course, the panel lining, does not follow the adjustments in height of the panel carried out to compensate manufacturing tolerances when the panel is being installed. During height adjustments of the sliding panel, the lining frame always remains in an unchanged relative position to the stationary parts of the sliding roof structure, that is to the sliding roof frame and to the lateral guide rails of the sliding panel. As a result of the rigid connection of the cross-beam to the forward slide shoes, it is also not possible for any relative movements to take place between the slide shoes and the lining frame.

For a sliding roof with a slidable-only panel, this means that a forward adjustment in height of the panel does not result in the sliding roof frame being displaced in height in the guide channels provided laterally for it. When the invention is used on a sliding roof with a sliding panel which can alternatively be slid or swung outwards and upwards, a straining of the forward transverse portion of the lining frame against the forward transverse portion of the sliding roof frame is avoided, because the forward transverse portion of the lining frame, as a result of its fixing to the cross-beam, no longer participates in the swinging-out movement of the sliding panel, so that an elastic deforming about a transverse axis of the forward transverse portion of the lining frame no longer occurs.

In the swinging-out movement, only the relatively narrow lateral components of the lining frame are now elastically bent in the middle region, which however does not render necessary any special additional operating force. For the same reason, any forming of a gap is also eliminated, when the pivot axis of the sliding panel, which can be both slid and also swung out, is situated in the vicinity of the forward edge of the panel. In this case also, the forward region of the panel lining remains practically stationary, so that lifting away from the forward transverse portion of the sliding roof frame is eliminated.

One especially simple and easily effected fixing of the lining frame to the cross-beam is attained, if at least two spaced-apart, stirrup-shaped and forwardly open stop springs are attached to the forward, transverse portion of the lining frame at its surface remote from the panel lining, these stop springs being capable of engagement onto the cross-beam when the lining frame is pushed in from the rear edge of the sliding panel. With this especially advantageous embodiment of the invention, the panel lining can, after the sliding panel has been adjusted in height, be secured to the cross-beam by means of said stop springs, by simply pushing from the rear. The cross-beam may here with advantage be constituted of a sheet metal section, which in its forward region possesses approximately the shape of an upwardly open U-member, adjoined at its rear flange by an obliquely, downwardly oriented riding surface for the stop springs, each of which can be engaged into the U-section by means of its spring arms projecting from the lining frame. This shape of the cross-beam serves both for the desired stiffness of the connection between the two forward slide shoes and also for a secure engagement of the stop springs with associated projections or depressions of the cross-beam, the latter beam moreover facilitating by means of its riding flange the pushing on of the stop springs and thus of the panel lining.

In an alternative embodiment, however, the arrangement may also be such that the forward transverse portion of the lining frame is secured in known manner (DT-PS No. 1,283,687) from below by clips or the like to the cross-beam. In this embodiment also, the lining frame can be easily secured to the cross-beam.

Within the scope of the concept of this invention, it is however also possible for the forward transverse component of the lining frame to be constructed as a cross-beam and to be attached to the forward slide shoes by connecting pieces. In this embodiment, the fixing of an additional cross-beam is unnecessary, because its functions are taken over by the forward transverse portion of the lining frame. This forward transverse portion must, of course, be adapted in regard to its cross-sectional shape to the stiffening requirements of the cross-beam, for example by transversely extending ribs or the like being mounted in the forward transverse portion of the lining frame. In this case, an additional fixing of the panel lining to the cross-beam by means of stop springs or clips is also unnecessary. It is indeed sufficient if, in the usual way, the stretched material which constitutes the panel lining is conducted around the lining frame and connected to the latter by gluing.

The arrangement according to this invention of a cross-beam which rigidly connects the forward slide shoes together makes possible an especially advantageous and simple attachment of the height adjustment elements for the sliding panel, in that the elements, themselves known, for adjustment of height of the sliding panel engage onto the cross-beam in the vicinity of its ends which are attached to the forward slide shoes or to the attachment pieces for these shoes. The fitting of additional supporting elements, attached to the forward slide shoes, for the height-adjustable connection to the forward pivot bearings of the sliding panel can therefore be omitted in the sliding roof according to this invention.

Figure 5:
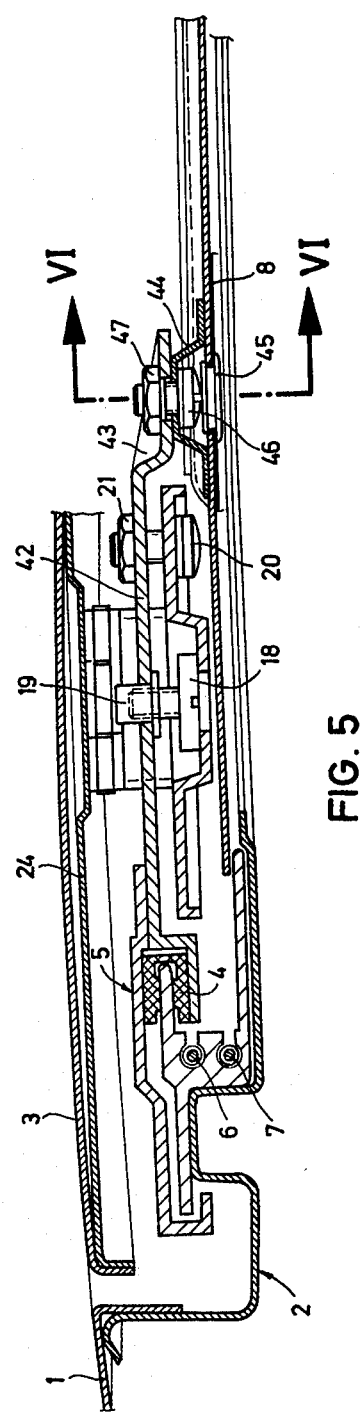
Figure 6:
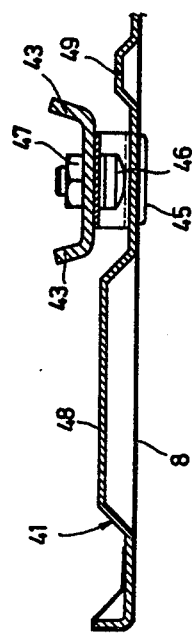
Figure 7:
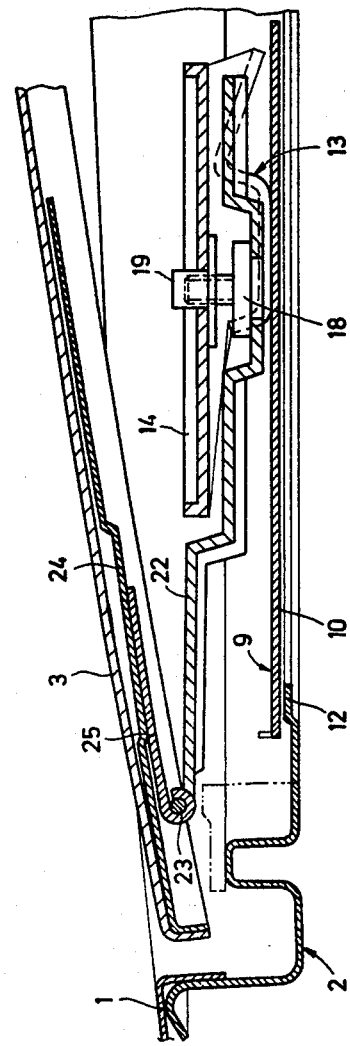
Figure 8:
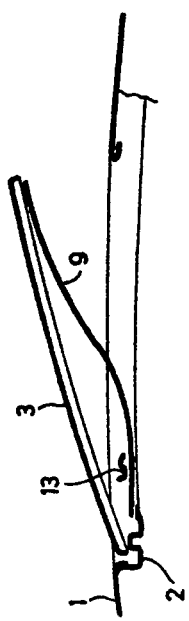

The invention is explained in more detail below with reference to the drawings, which illustrate examples of embodiment thereof. The drawings show:

FIG. 1 a cut-away plan upon the forward, left corner of a sliding roof constructed according to this invention, FIG. 2 a section along the line II—II in FIG. 1, FIG. 3 a section along III—III in FIG. 1, FIG. 4 a section similar to FIG. 3 with a different attachment of the forward transverse portion of the lining frame to the cross-beam, FIG. 5 a section similar to FIG. 2 through a different form of embodiment of the invention, wherein the forward transverse portion of the lining frame is constructed as a cross-beam, FIG. 6 a section along VI—VI in FIG. 5, FIG. 7 a section along VII—VII in FIG. 1 with the sliding panel swung out and FIG. 8 to a smaller scale, a diagrammatic section through a sliding roof constructed according to this invention with the sliding panel swung out.

In the drawings, a vehicle roof 1 can be seen, in which a roof opening is provided, stiffened by a surrounding sliding roof frame 2 and capable of being closed by the sliding panel 3. To guide the sliding panel 3, the guide rails 4 are attached to the lateral frame parts of the sliding roof frame 2, only the left-hand guide rail being shown in the drawings (FIGS. 2,5), the right-hand guide rail being the same, but to opposite hand. On the guide rails 4, the sliding panel 3 is slidably guided at each side of the panel with one forward and one rear sliding shoe each, of which only the left, forward sliding shoe 5 is shown in the drawings.

As can be seen from FIGS. 2 and 5, in the present example the guide rails 4 are constructed to house threaded cables 6 and 7, each of which is attached to the rear sliding shoe for the purpose of driving the panel. Since the driving situation of the sliding roof according to this invention is not important for explaining the invention, further details of the sliding roof drive are not shown in the drawings. Thus, for example, in FIG. 1 the drive components such as corner piece, cable guide at the front and cable box, which form part of this type of sliding roof drive and adjoin the guide rail 4, are not shown. More detailed explanation of the sliding roof drive by means of threaded cables will also be omitted, because the invention can be utilized for all types of sliding roof explained in the descriptive introduction.

The lower face of the sliding panel 3 is covered by the panel lining 8. This consists, as usual, of a textile material or a plastics sheet, which is stretched over the lining frame 9, turned around its edges and glued to it. Of the lining frame 9, which as usual is made from a thin, resilient sheet material, only the forward, wide transverse portion 10 and one of the narrow lateral portions 11 are illustrated in the drawing (FIG.1). When the sliding panel 3 is closed and also when it is swung out (FIG. 7), the forward, transverse portion 10 overlaps the inner flange 12 of the forward, transverse portion of the sliding roof frame 2. To simplify the illustrations, only the lining frame 9 is shown in FIGS. 1 and 7, and not the panel lining 8.

As can be seen most easily from FIGS. 1 and 2, the cross-beam 13 is attached to the forward sliding shoe 5, this beam being also attached to the right, forward sliding shoe in a similar but handed manner, on the right side of the roof which is not illustrated here. The cross-beam 13, which is profiled in a manner to be explained later as in FIG. 3, is cranked upwards at each of its ends and then widens out to an installation plate 14 for the attachment of the elements which are to be provided for the adjustment in height of the sliding panel. In the example of embodiment shown in FIG. 2, the cross-beam 13 is attached to the sliding shoe 5 by means of the installation plate 14. For this purpose, the installation plate 14 is equipped, at its outer end, with an angle-shaped edge portion 15, between which and an accociated flange 16 of the sliding shoe 5, which flange is attached to the installation plate 14, a sliding bush 16a, seated upon the guide rail 4, is clamped.

The elements, themselves known, for the height adjustment of the sliding panel 3 consists of a profile plate 17, disposed between the lining frame 9 and installation plate 14, of a central adjustment screw 18, of a threaded sleeve 19 attached to the installation plate 14 and of three fixing bolts 20, each with associated nuts 21 engaging into the installation plate 14. The arrangement of these elements can be seen best from FIGS. 1, 2 and 5. Integrally formed in one piece with the profiled plate 17, is the bearing projection 22, extending to the forward edge of the sliding panel 3, which bearing projection forms the connection between the sliding shoe 5 and the sliding panel 3 by means of the pivot bearing 23 (FIG. 7) and the bearing portion 25, secured to the forward panel stiffener 24. It can be seen that, after the three fixing bolts 20 have been loosened and the central adjustment screw 18, which bears with its head against the profiled plate 17, has been screwed out or screwed in out of or into the threaded sleeve 19 and then the fixing bolts 20 have again been tightened up, the vertical distance between the profiled plate 17 and the installation plate 14 and thus between the sliding shoe 5 and the sliding panel 3 can be adjusted in order to compensate any manufacturing tolerances.

In the adjustment operation just explained, the installation plate 14 and cross-beam 13 remain in an unchanged position relative to the sliding roof frame 2.

As can be seen from the example of embodiment according to FIGS. 1 and 3, the stop springs 26, of which only one is shown in the drawing, are attached to the forward transverse portion 10 of the lining frame 9. For this purpose, in the example illustrated, the stop spring 26 is conducted with its lower arm 27 through an opening 28 in the forward, transverse portion 10 and is firmly connected to this portion by a rivet 29. The stop spring 26 grips around the cross-beam 13, with its spring arm 30 projecting forwards from the forward transverse portion 10 of the lining frame. The cross-beam is formed of a metal sheet section and consists of the upwardly open U-member 31 and of the riding flange 33 adjoining its rear flange 32. The spring arm 30 is oriented obliquely upwards at its forward end, to enable it to be pushed onto the riding flange. To fix the stop spring 26 to the cross-beam 13, the spring arm 30 engages, with a projection 34, around the flange 32, while the outer edge of the riding flange 33 bears against the lower end 35 of the spring arm 30. The stop springs 26 not only make possible a secure fixing of the panel lining 8 to the cross-beam 13, but also permit the lining frame 9, with the panel lining attached to it, to be pushed without difficulty onto the cross-beam 13 from the rear, when the sliding roof is being assembled.

In the example of embodiment illustrated in FIG. 4, the forward, transverse portion 10 of the lining frame 9 is furnished with openings 36, opposite to which are corresponding openings 37 in the cross-beam 38. The cross-beam 38, in this example, possesses only a U-cross-section. Clips 40, furnished with lateral engagement projections 39, are introduced from below through the openings 36 and 37, these clips ensuring a secure fixing of the lining frame 9 to the cross-beam 38. The clips 40 should be inserted into the openings 36 in the forward transverse portion 10, before the panel lining 8 is stretched across the lining frame 9.

In the example of embodiment shown in FIGS. 5 and 6, the forward, transverse portion 41 constitutes the cross-beam which rigidly connects the forward sliding shoes 5 together. In this arrangement, each sliding shoe 5 is adjoined by the connecting piece 42, which is constituted essentially in a similar manner to the installation plate 14 of the cross-beam 13 of the above described embodiment. At its end intended for attachment to the forward, transverse portion 41, the connecting piece 42 is downwardly cranked, forming lateral stiffenings 43. Opposite to this cranked portion, a pot-shaped connecting pedestal 44, oriented upwards, is attached to the forward, transverse portion 41 of the lining frame, the internal space of this pedestal being accessible through an opening in the forward transverse portion 41, which can be closed by a plastic plug 45. Through this opening, a bolt 46 is introduced, which passes through an opposite bore in the cranked portion of the connecting piece 42 and in conjunction with a nut 47 ensures a rigid connection between the connecting piece 42 and the forward transverse portion 41, which acts as the crossbeam. As can be seen from FIG. 6, the forward transverse portion 41 is furnished with two corrugations 48 and 49 to attain sufficient stiffness, which corrugations 48 and 49 do not however need to extend over the entire length of the forward transverse portion 41, as shown in FIG. 5. It is sufficient if the corrugations are present only in the region which needs to be stiffened, between the two opposite fixing positions defined by the bolts 46.

The diagrammatic representation of FIG. 8 shows the sliding panel 3 swung out to its maximum position and the curved form of the lining frame 9, which this frame adopts in the position indicated. It can be seen clearly here that the forward region of the lining frame 9 has remained in a position parallel to the vehicle roof 1 and sliding roof frame 2, whereas the middle region is elastically deformed with large bending radii. A corresponding position is of course also adopted by the panel lining 8. For the bending of the lining frame 9 which, as already mentioned, takes place only at the narrow side portions 11 (FIG.1) of the lining frame, it is not necessary for appreciable operating forces to be applied.

At its rear end, the lining frame 9 is attached elastically in known manner to the sliding panel 3, for example it is attached by leaf springs to the sliding panel (not shown).

I claim:

1. A sliding roof for automobiles, comprising a rigid sliding panel, slidably guided in a roof opening on lateral guide rails by means of forward and rear sliding shoes, said guide rails supported by the housing attached to the roof of said automobile, which panel is connected in a pivotally movable and height adjustable manner generally toward the forward edge of said panel with the forward sliding shoes, and the lower face of which is covered with a panel lining secured to a lining frame, said lining frame being attached at the front to a cross-beam which rigidly connects together the forward sliding shoes, at least two spaced apart, stirrup-shaped, forwardly open stop springs are attached to the forward transverse portion of the lining frame on its surface remote from the panel lining, which stop springs can be engaged onto the cross-beam when the lining frame is pushed in from the rear edge of the sliding panel.

2. Sliding roof according to claim 1 wherein said cross-beam is formed of a sheet-metal section, which has in its forward region approximately the shape of an upwardly open U-member, the rear flange of which is adjoined by an obliquely downwardly oriented riding flange for the stop springs, which can each be engaged into the U-member with their spring arms which project forwards from the lining frame.

3. Sliding roof according to claim 1, wherein said forward, transverse portion of the lining frame is attached in known manner from below by clips or the like to the cross-beam.

4. Sliding roof according to claim 1, wherein said forward, transverse portion of the lining frame is constructed as a cross-beam and is attached to the forward sliding shoes by connecting pieces.

5. Sliding roof according to claim 1 wherein said elements height adjustment of the sliding panel act upon the cross-beam in the vicinity of its ends or upon its connecting pieces which are attached to the forward sliding shoes.

* * * * *

UNITED STATES PATENT AND TRADEMARK OFFICE
CERTIFICATE OF CORRECTION

PATENT NO. : 4,103,962
DATED : August 1, 1978
INVENTOR(S) : Albert Schlapp

It is certified that error appears in the above-identified patent and that said Letters Patent are hereby corrected as shown below:

Column 5, Line 54, after "an" delete 'ac' and insert --as--.

Column 5, Line 55, delete 'cociated' and insert --sociated--.

Column 5, Line 59, after "3" delete 'consists' and insert --consist--.

Signed and Sealed this

Twentieth Day of February 1979

[SEAL]

Attest:

RUTH C. MASON
Attesting Officer

DONALD W. BANNER
Commissioner of Patents and Trademarks